(12) United States Patent
Itou

(10) Patent No.: US 9,789,826 B2
(45) Date of Patent: Oct. 17, 2017

(54) VEHICLE SEAT

(71) Applicant: TACHI-S CO., LTD., Tokyo (JP)

(72) Inventor: Yasuyuki Itou, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 14/758,744

(22) PCT Filed: Dec. 18, 2013

(86) PCT No.: PCT/JP2013/083916
§ 371 (c)(1),
(2) Date: Jun. 30, 2015

(87) PCT Pub. No.: WO2014/112275
PCT Pub. Date: Jul. 24, 2014

(65) Prior Publication Data
US 2015/0336515 A1 Nov. 26, 2015

(30) Foreign Application Priority Data
Jan. 16, 2013 (JP) .................. 2013-005157

(51) Int. Cl.
*B60R 11/00* (2006.01)
*B60N 2/64* (2006.01)
(Continued)

(52) U.S. Cl.
CPC ............... *B60R 11/00* (2013.01); *B60N 2/06* (2013.01); *B60N 2/58* (2013.01); *B60N 2/64* (2013.01);
(Continued)

(58) Field of Classification Search
CPC ......... B60R 11/00; B60R 7/043; B60R 7/084; B60N 2/06; B60N 2/64; B60N 2/58
(Continued)

(56) References Cited

U.S. PATENT DOCUMENTS 7,178,867 B2 * 2/2007 Hough ................... B63C 9/22
297/188.08 X
2004/0056500 A1 3/2004 Kayumi et al.
2006/0076795 A1 * 4/2006 Slade ................... B60N 2/062
296/64 X

FOREIGN PATENT DOCUMENTS

DE 7004709 U 9/1970
DE 4229695 A1 3/1994
(Continued)

*Primary Examiner* — Anthony D Barfield
(74) *Attorney, Agent, or Firm* — Birch, Stewart, Kolasch & Birch, LLP

(57) ABSTRACT

A seat cushion for a vehicle, which includes one seat cushion portion and another seat cushion portion, such that one or both of those one and another seat cushion portions may be displaced via side rails. A storage space is defined in a forwardly-facing region of one of those two seat cushion portions. An opening region is provided to that storage space and constitutes an ingress/egress opening of the storage space for allowing an article(s) to be entered thereinto and taken out therefrom. This opening region is defined in a lateral surface of a selected one of the two seat cushion portions. Thus, when the selected one of the two seat cushion portions is displaced in a forward direction to protrude from the other of the two seat cushion portions, the lateral surface is exposed outwardly on a side facing a center of the vehicle.

9 Claims, 5 Drawing Sheets

(51) Int. Cl.
*B60R 7/08* (2006.01)
*B60N 2/58* (2006.01)
*B60N 2/06* (2006.01)
*B60R 7/04* (2006.01)

(52) U.S. Cl.
CPC .............. *B60R 7/043* (2013.01); *B60R 7/084* (2013.01); *B60N 2205/35* (2013.01); *B60R 2011/0012* (2013.01)

(58) Field of Classification Search
USPC .................. 297/188.01, 188.08, 188.12, 182
See application file for complete search history.

(56) References Cited

FOREIGN PATENT DOCUMENTS

| | | |
|---|---|---|
| JP | 55-102643 | 7/1980 |
| JP | 58-61061 U | 4/1983 |
| JP | 58-192750 U | 12/1983 |
| JP | 62-200051 U | 12/1987 |
| JP | 7-3397 U | 1/1995 |
| JP | 8-127279 A | 5/1996 |
| JP | 8-132937 A | 5/1996 |
| JP | 2004-106738 A | 4/2004 |

* cited by examiner

VEHICLE SEAT

TECHNICAL FIELD

The present invention relates to a seat for use with a vehicle.

BACKGROUND ART

Conventionally, in this kind of technical field, a Japanese Laid-Open Patent Publication No. Hei 8-132937 discloses a vehicle seat wherein a seat back of the seat is rotatably connected to a seat cushion of the seat via a reclining device so as to be inclinable relative to the seat cushion. In this seat, the seat back is therefore adjustingly inclinable in forward and rearward directions of the seat. When the seat cushion is set at its upright position relative to the seat back, a rear portion of that seat cushion is concealed under a lower portion of the seat back. In such rear portion of the seat cushion, there is provided a storage recessed region which allows some articles to be stored therein, in such a manner that the storage recessed region may be exposed outwardly, upon the seat back being inclined downwardly. With this arrangement in the seat, such storage recessed region is normally concealed and not viewed by any passenger, but can be exposed by inclining the seat back downwardly for the purpose of storing some small articles therein.

Further, a vehicle seat disclosed in a Japanese Laid-Open Patent Publication No. Hei 8-127279 shows a recessed region provided in a surface of a seat cushion of the seat, the recessed region being positioned substantially at a center of the seat cushion as viewed in a transverse direction of the seat cushion. Fitted in that recessed region is a cushion element having a cup holder provided therein so as to be rotatable in order for a user to select either a working surface of the cushion element or a reverse surface thereof. Normally, the reverse surface of the cushion element is exposed outwardly in registry with the surface of the seat cushion, but when the user rotates the cushion element from that normal state, the working surface thereof as well as the cup holder provided therein are exposed outwardly in the surface of the seat cushion. This arrangement insures that a stable, comfortable seating touch is offered to the user, while preventing degradation of aesthetic appearance of the seat in a normal use of the seat, and also permits the cup holder to be exposed for its use as required.

PRIOR-ART LITERATURE

Patent-Related Document

Patent-related Document 1:
Japanese Laid-Open Patent Publication No. Hei 8-132937
Patent-related Document 2:
Japanese Laid-Open Patent Publication No. Hei 8-127279

SUMMARY OF THE INVENTION

Problems to be Solved by the Present Invention

However, in any of the above-described conventional vehicle seats, the recessed region and the cushion element having the cup holder therein are provided as a storage portion for allowing article (s) to be stored therein, and such storage portion is disposed in the surface of the seat cushion. More or less, this may give an objectionable touch to a passenger sitting on the seat, and further, increasing a size of the storage portion is limited and can hardly be done, considering the fact that an increased size of the storage portion will impair and degrade the aesthetic appearance of the seat.

It is a purpose of the present invention to provide a vehicle seat which can minimize the possibility of an objectionable touch of a seat cushion of the seat to a seat occupant, and further has a storage space defined in the seat cushion as an area for storage of an article(s) therein, such storage space being able to be easily increased in dimensions.

Means for Solving the Problem

In accordance with the present invention, there is provided a seat for use with a vehicle, which includes a seat cushion divided into one seat cushion portion and another seat cushion portion, wherein those one and another seat cushion portions are to be disposed along a transverse direction of the vehicle, in such an arrangement as to permit one or both of the aforesaid one and another seat cushion portions to be displaceable via slide rails in a forward direction of the vehicle to protrude from the other of the aforesaid one and another seat cushion portions,
the seat being characterized in that:
a storage space is defined in a forwardly-facing region of a selected one of the aforesaid one and another seat cushion portions, wherein the selected one of those one and another seat cushion portions is adapted to be displaced in the forward direction so as to protrude from the other of those one and another seat cushion portions; and
an opening is provided to the storage space, such opening constituting an ingress/egress opening of the storage space for allowing an article (s) to be entered thereinto and taken out therefrom, wherein the opening is defined in a lateral surface of the selected one of the one and another seat cushion portions, and wherein the aforesaid lateral surface is to be exposed outwardly on a side facing a center of the vehicle when the selected one of the one and another seat cushion portions is displaced in the forward direction to protrude from the other of the one and another seat cushion portions.

According to this vehicle seat, the storage space is disposed in the forwardly-facing region of the seat cushion, and such forwardly-facing region is a location to receive a relatively small weight of a passenger. Namely, the passenger's body portion may hardly reach the storage space and therefore in most cases, the passenger will not feel any objectionable seating touch on the seat cushion. In addition, the storage space can be formed to a large size, thereby permitting increase of its dimensions as required for storage of articles therein. Moreover, at the storage space, an opening is formed in the lateral surface of the seat cushion on a side facing a center of the vehicle, and such opening constitutes the ingress/egress opening for allowing an article (s) to be entered thereinto and taken out therefrom. By the virtue thereof, when the aforesaid one seat cushion portion having that opening is moved rearwardly, the ingress/egress opening corresponding to the opening is concealed by the aforesaid another seat cushion portion. This is quite advantageous for maintaining the appearance of the seat in an aesthetically desirable condition.

Also, according to the vehicle seat, a box-like container having a robust property sufficient to retain its original shape may be provided in the forwardly-facing region of the seat cushion, wherein the box-like container includes the aforesaid storage space defined therein. This box-like container may be fixedly secured to a frame provided in the seat cushion.

With this arrangement, the box-like container having a robust property sufficient to retain its original shape can easily be built in the seat cushion and stably retained therein.

Further, a slit may be formed in a front surface of the forwardly-facing region of the seat cushion so as to communicate with the storage space.

This slit arrangement enables a user to pull out a tissue paper one by one from a tissue paper box installed in the storage space. Accordingly, the tissue paper box is within reach of a user and offers a great convenience to him or her, which is a good solution to the problem that the user is quite often annoyingly forced to find an appropriate place on which the tissue paper box can be put, in the vehicle.

Still further, the aforesaid storage space may be formed by cutting out a localized region of a padding that forms a part of the seat cushion.

In this instance, the storage space can be easily and readily formed in the seat cushion, with an extremely simplified configuration of the storage space itself.

Furthermore, a ratio between the aforesaid one seat cushion portion to be positioned on a left side of the vehicle and the aforesaid another seat cushion portion to be positioned on a right side of the vehicle may be 6:4 or vice versa in the transverse direction of the vehicle, and the aforesaid storage space be defined either in one of the aforesaid one and another seat cushion portions or in both of the aforesaid one and another seat cushion portions.

In the case where such 6:4 split seat cushion arrangement is applied to a second or third rear seat, a central area between the one and another seat cushion portions will be rarely used by a seat occupant (s), so that there is almost no chance for the seat occupant's body portion to reach the storage space, and therefore in most cases, the seat occupant (s) will not feel any objectionable seating touch on the seat cushion. In addition, by simply setting the left- and right-side seat cushion portions abreast of each other, the ingress/egress opening can be concealed therebetween and invisible, whereas on the other hand, to move one of those two seat cushion sections forwardly to protrude from the other thereof will cause the ingress/egress opening to appear outwardly. This arrangement can effectively prevent the aesthetic appearance of the seat from being undesirably degraded.

Effects of the Invention

The present invention therefore has the effect that the possibility of an objectionable touch to a seat occupant on the seat cushion can be minimized, and further, by moving the seat cushion rearwardly, the ingress/egress opening of the storage space can be concealed, which prevents an aesthetic appearance of the seat from being undesirably degraded.

MODE FOR CARRYING OUT THE INVENTION

Hereinafter, with reference to the annexed drawings, a detailed description will be made of preferred embodiments of a vehicle seat in accordance with the present invention.

Figure 1:
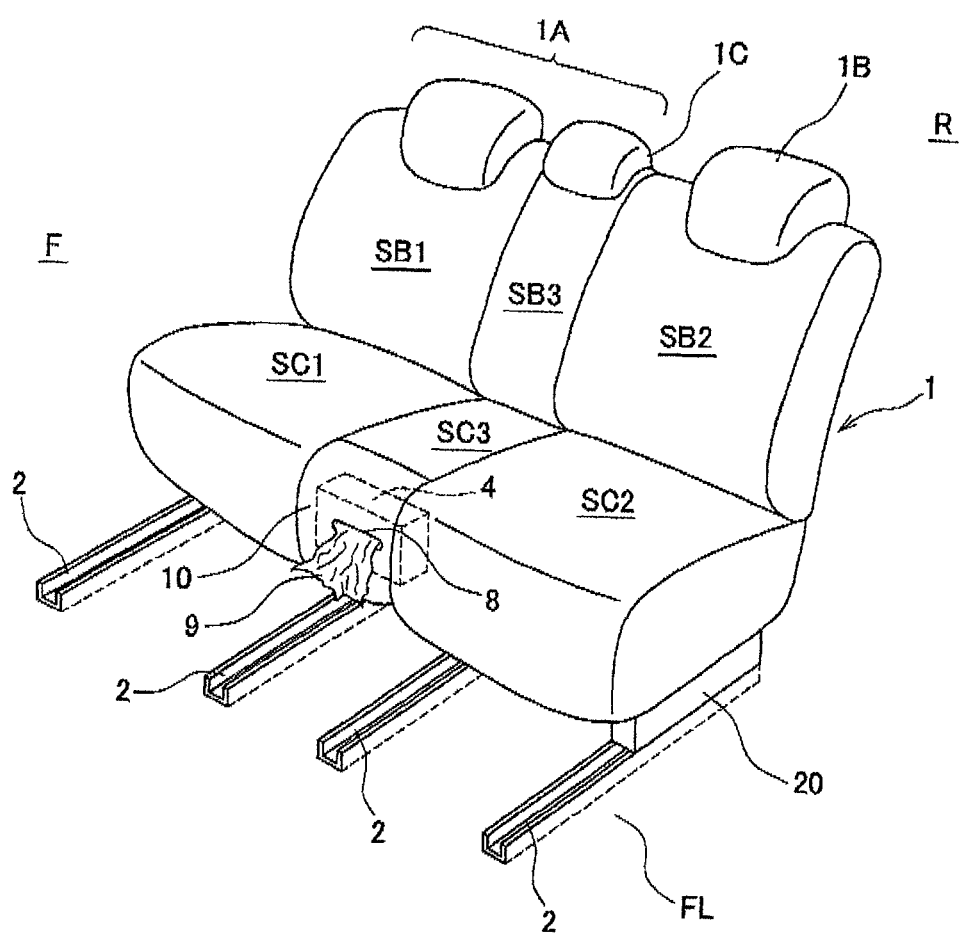
FIG. 1: A perspective view showing one exemplary embodiment of a vehicle seat in accordance with the present invention.
Figure 2:
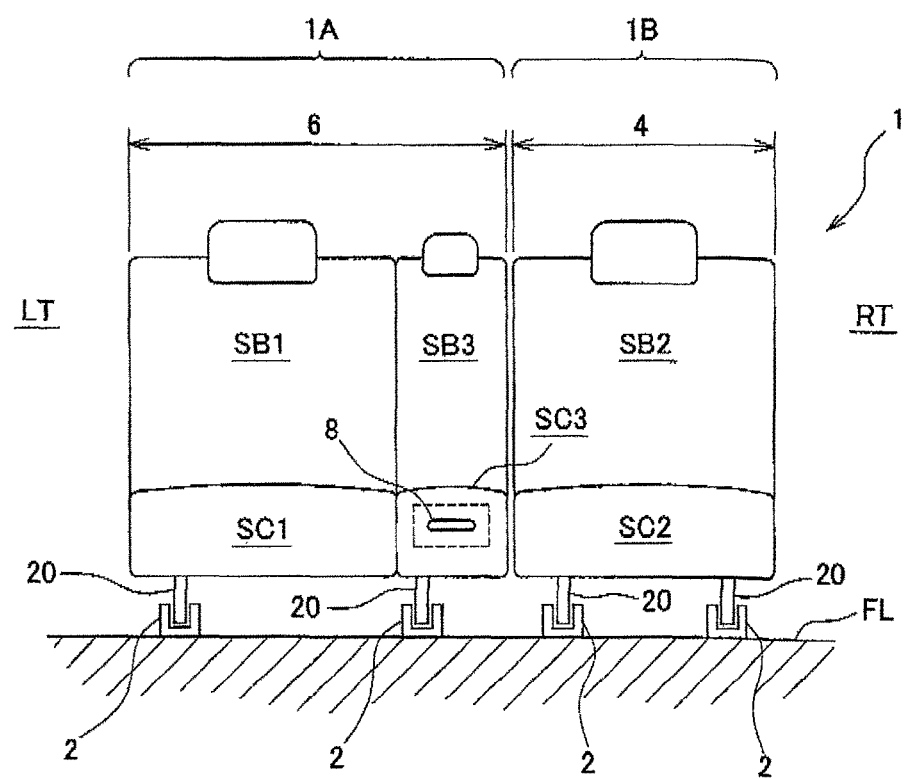
FIG. 2: A front view of the vehicle seat shown in the FIG. 1.

In FIGS. 1 and 2, a vehicle seat 1 is depicted to be a second rear seat comprising: a first split-type seat portion 1A (on the left side in the Figures) composed of a wide seat section and a narrow seat section, such that a ratio between the wide seat section and the narrow seat section is 6:4 as viewed in a transverse direction of the vehicle seat; and a second seat portion 1B (on the right side in the Figures). Those first and second seat portions are arranged to be displaceable by means of slide rails 2, 2, 2 and 2, such that one of the first and second seat portions may be moved forwardly and positioned ahead of the other of the first and second seat sections, while on the other hand, both of the first and second seat portions may be moved and positioned forwardly from their respective home positions. In this regard, the first seat portion 1A includes a subsidiary seat area defined integral therewith, such subsidiary seat area constituting a middle seat portion 1C adjacent to the second seat position 1B. The first seat portion 1A comprises a left-side seat cushion SC1 and a left-side seat back SB1. The second seat portion 1B comprises a right-side seat cushion SC2 and a right-side seat back SB2. The middle seat portion 1C comprises a middle seat cushion SC3 and a middle seat back SB3.

In other words, the seat cushions SC1 and SC3 of the first seat portion 1A and the seat cushion SC2 of the second seat portion 1B are respectively movable on and along the associated lower rails 2, 2, 2 and 2 of the slide rails fixed on a vehicle floor FL, such that one of the seat cushions SC1 and SC2 may be moved forwardly and positioned ahead of the other of the seat cushions SC1 and SC2, while both of the seat cushions SC1 and SC2 be moved and positioned forwardly from their respective home positions. Connected respectively to those two seat cushions SC1 and SC2 are the seat backs SB1 and SB2 each being inclinable and foldable down.

Also, the middle seat cushion SC3 of the middle seat portion 1C forming a part of the first seat portion 1A are provided with corresponding lower rails 2 of the slide rails fixed on the vehicle floor.

Figure 3:
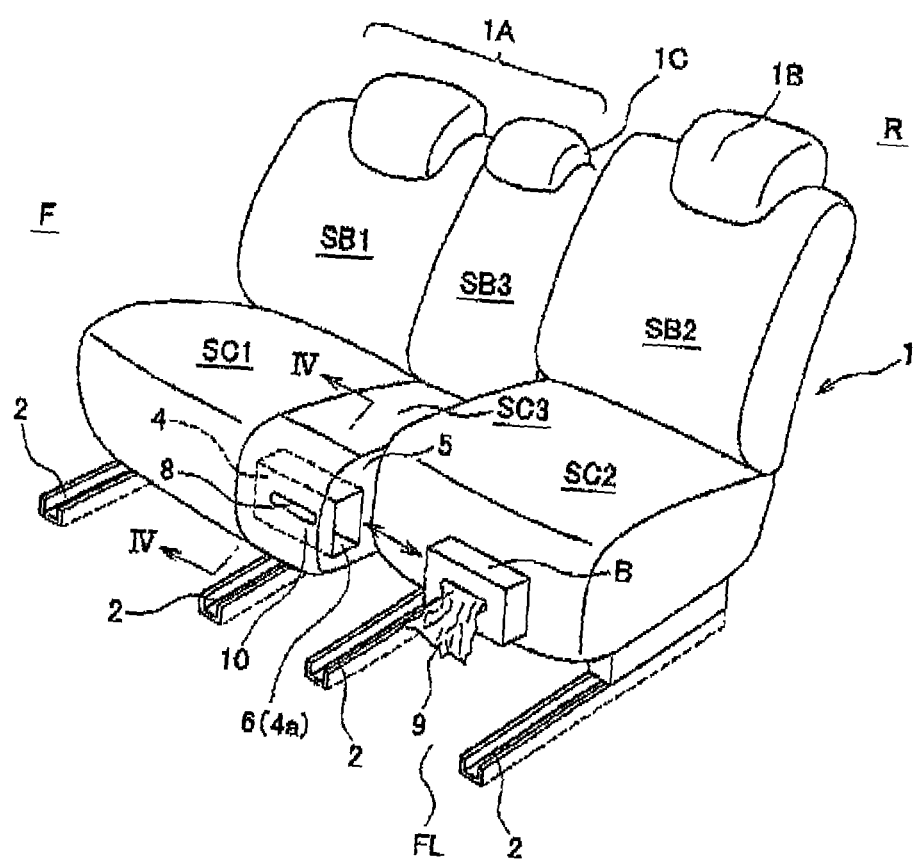
FIG. 3: A perspective view showing a 6:4 split type of seat employed in the vehicle seat, which indicates a state where left and right seat sections of the seat are displaced relative to each other.
Figure 4:
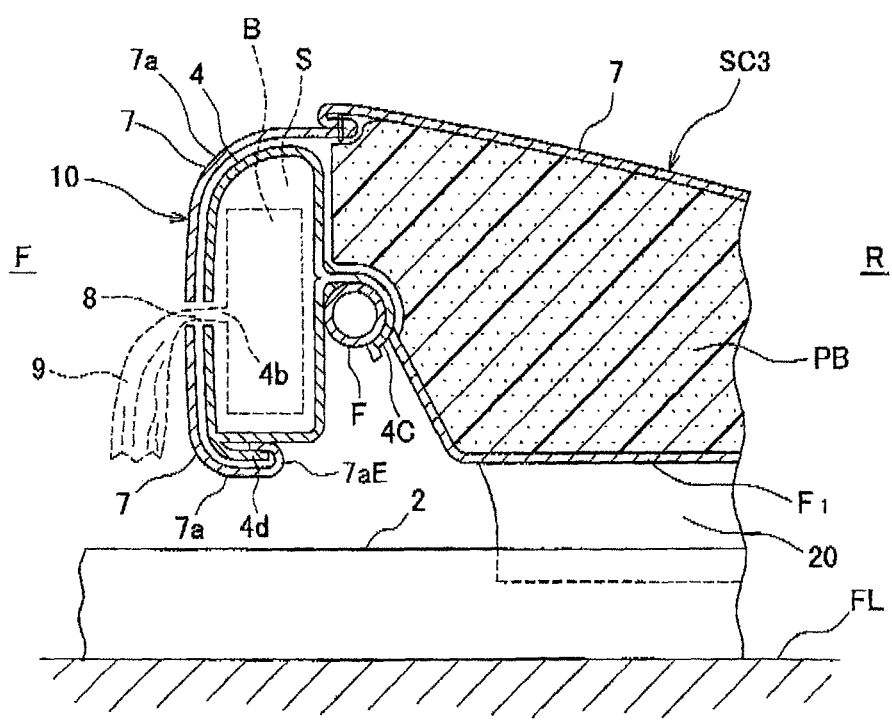
FIG. 4: A sectional view taken along the line IV-IV in the FIG. 3.

As shown in FIGS. 3 and 4, a box-like container 4 formed of a synthetic resin or metallic material, which has a robust property sufficient to retain its original shape, is provided in the middle seat cushion SC3 of the middle seat portion 1C, such that the container 4 is located near to a front end of that middle seat cushion which faces a forward side of the seat. Defined in that box-like container 4 is a storage space S adaptable for use as a storage region in which an article(s), such as a small article(s) or a tissue paper box B, may be contained and stored. The seat cushion SC3 has a rectangular ingress/egress opening 6 defined in a lateral surface 5 thereof, wherein the lateral surface 5 faces a center of a vehicle in which the seat is to be provided. The box-like container 4 is formed such that its right end is closed, while its left end is opened to define an opening region 4a. This opening region 4a of the box-like container is indicated as being positioned within the ingress/egress opening 6 of the seat cushion SC3 and accessible therethrough. Accordingly, a small article(s) or a tissue paper box B for instance can be entered inserted into the ingress/egress opening 6 along a lateral direction of the seat cushion towards the box-like container.

The box-like container 4 has a rear surface facing a rear side of the seat cushion. Provided to that rear surface of the box-like container is a securing hook member 4*c* so configured to be hookingly attached about a tubular frame F which is provided in the seat cushion SC3 at a forwardly-facing end region of the same SC3. As shown, the securing hook member 4*c* is attached about the tubular frame F disposed at the forwardly-facing end region of the seat cushion and is fixedly secured to that tubular frame as by welding or securing screw (s). In that manner, the box-like container 4, having a robust property sufficient to retain its original shape, is fixed to the tubular frame F in the seat cushion SC3. This means that such box-like container 4 can easily be built in the seat cushion SC3 and stably retained therein, with a great reliability.

Also, the box-like container 4 is shown to be situated within a cut-out portion of a foam padding PB provided in the seat cushion SC3. The foam padding PB is supported on a support element F1. Fixed to that support element F1 is an upper rail 20 slidably engaged with the lower rail 2 of the seat rail. A trim cover assembly 7, which forms a surface cover element of the seat cushion SC3, includes a trim cover section 7*a* adapted to cover the box-like container, and therefore, the box-like container 4 is covered with such trim cover section 7*a*. A lower end portion 7*a*E of the trim cover section 7*a* is fixedly secured to a bottom surface 4*d* of the box-like container 4 by an adhesive. With this arrangement, the box-like container 4 is invisibly provided in the seat cushion SC.

A slit 8 is formed in a forwardly-facing area of the trim cover section 7*a* corresponding to a front surface 10 of the seat cushion SC3, in such a fashion that the slit 8 communicates with the storage space S defined in the box-like container 4. The slit 8 is shown to be elongated horizontally and is substantially identical in size to a slit 4*b* formed in a front surface of the box-like container 4, wherein such front surface of the box-like container faces the front side of the seat cushion. Hence, a user can pull out a tissue paper 9 from the tissue paper box B placed in the box-like container 4, so that the tissue paper may be moved through and past both two slits 4*b* and 8 in a direction from the inside of the box-like container to the outside thereof, and drawn out from the front side of the seat cushion SC3.

The foregoing arrangement of the slit 8 enables a user to pull out the tissue paper 9 one by one from the tissue paper box B placed in the storage space S. Accordingly, the above-described disposition of the tissue paper box B is obviously within reach of a user and offers a great convenience to him or her, which is a good solution to the problem that the user is quite often annoyingly forced to find an appropriate place on which the tissue paper box can be put, in the vehicle.

Also, according to the present vehicle seat, the storage space S is disposed in the forwardly-facing end region of the seat cushion SC3 of the middle seat portion 1C, and such forwardly-facing end region of the seat cushion SC3 is a location to receive a relatively small weight of a passenger. Namely, the passenger's body portion may hardly reach the storage space S, and therefore in most cases, the passenger will not feel any objectionable seating touch on the seat cushion SC3. In addition, the storage space S can be formed to a large size, thereby permitting increase of its dimensions for storage of articles therein.

Further, for example, when it is desired to store the tissue paper box B in the storage space S, the first seat portion 1A may be moved forwardly relative to the second seat portion 1B, as shown in FIG. 3, so that the former 1A is positioned ahead of the latter 1B. In that instance, the lateral surface 5 of the seat cushion SC3 of the middle seat portion 1C forming a part of the first seat portion 1A is exposed to the outside, wherein that lateral surface 5 faces a center of a vehicle in which the seat is to be provided. Such exposure of the lateral surface 5 therefore makes accessible the opening region 4*a* that forms a part of the ingress/egress opening 6 of the storage space S, whereby for example a user can easily place the tissue paper box B in the storage space S and also can easily take out the tissue paper box B from the storage space S.

Furthermore, the first seat portion 1A that has been moved forwardly as stated above may be moved back to a rearward normal position shown in FIG. 1, so that the seat cushion of the first seat portion 1A will be positioned abreast of the seat cushion SC2 of the second seat portion 1B in aligned relation therewith. Or, that first seat portion 1A may be moved rearwardly relative to the second seat portion 1B and positioned rearward of the seat cushion SC2. In either way, the lateral surface 5 of the seat cushion SC3 of the middle seat portion 1C forming a part of the first seat portion 1A will disappear behind the seat cushion SC2 of the second seat portion 1B, so that the opening region 4*a* of the storage space S of the seat cushion SC3 can be concealed and invisible. This is quite advantageous for maintaining the appearance of the seat 1 in an aesthetically desirable condition.

As shown, an entirety of the seat cushion includes the aforementioned 6:4 split seat cushion and the central area corresponding to the middle seat cushion, and particularly where where such seat cushion arrangement is applied to a second or third rear seat, the said central area of the seat cushion is rarely used by a seat occupant (s), so that there is almost no chance for the seat occupant's body portion to reach the storage space S, and therefore in most cases, the seat occupant will not feel any objectionable seating touch on the seat cushion. In addition, by simply setting the left- and right-side seat cushions abreast of each other, the ingress/egress opening 6 can be concealed therebetween and invisible, whereas on the other hand, to move one of those two seat cushions forwardly to protrude from the other thereof will cause the ingress/egress opening 6 to appear outwards. This arrangement can effectively prevent the aesthetic appearance of the seat 1 from being undesirably degraded.

It should be understood that the present invention is not limited to the above-described embodiment.

Figure 5:
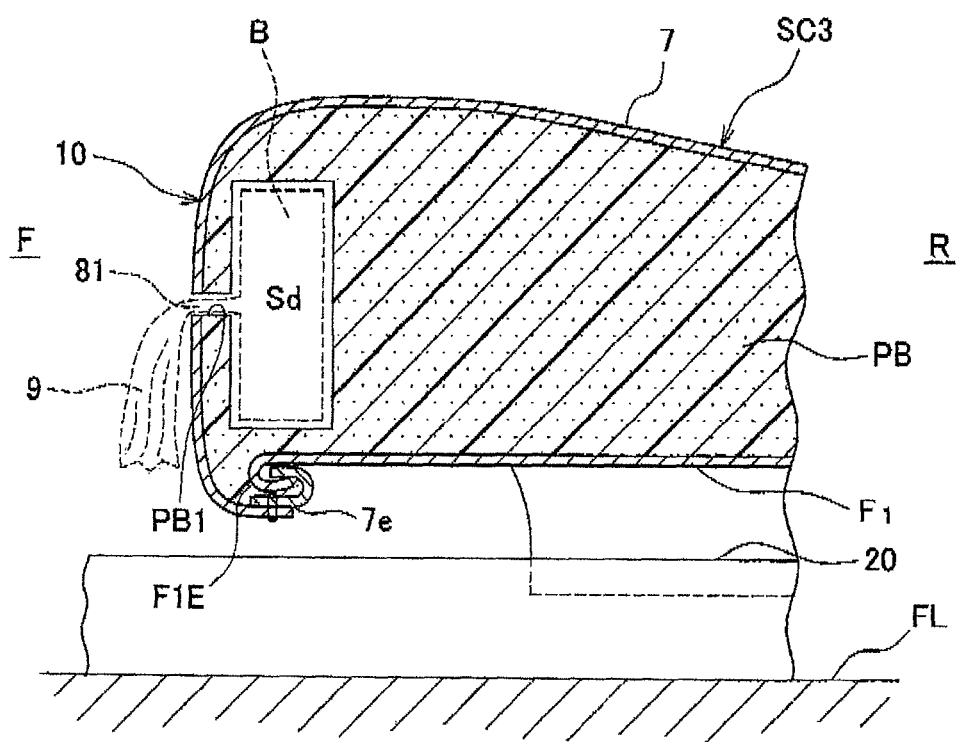
FIG. 5: A sectional view showing another exemplary embodiment of vehicle seat in accordance with the present invention, as viewed form a same side as shown in the FIG. 4.

As suggested in FIG. 5 for example, a storage space Sd may be defined in the foam padding PB forming a part of the seat cushion SC by cutting out a localized region of the foam padding, such that the storage space is given in a hollow fashion. In other words, the foam padding PB may be cut out so as to define a hollow therein, whereby the storage space Sd is given at the hollow in the foam padding, and further, a slit PB1 may be so formed as to penetrate the front region at 10 of the seat cushion SC3 towards the storage space Sd, so that the slit PB1 communicates with the storage space Sd in which the tissue paper box 4 is placed. Such slit PB1, which extends horizontally, is shown to be in alignment with a slit 81 which is formed in a surface cover element 7 on a side facing the front side of the storage space Sd. According to this embodiment, the storage space Sd can be easily and readily formed in the seat cushion SC, with an extremely simplified configuration of the storage space itself.

Designation 7e denotes an end of the surface cover element 7. This end of the surface cover element is securely connected to a distal end F1E of the support member F1 provided to the foam padding PB.

The above-described vehicle seat may be used as a front or first seat, a second rear seat, or third rear seat.

It is to be noted that the storage space S may be formed in one or both of the seat cushions SC2 and SC3 respectively of the first and second seat portions. In addition, the storage space S of the box-like container 4 be so modified to allow storage of an umbrella(s) therein, for instance. In that mode, since there is quite a little occasion for a user to put the umbrella or other article that does not require its frequent use in such kind of storage space and take it therefrom, there may be eliminated the necessity of forming the aforesaid slit 8 in the front surface 10 of the seat cushion SC.

Moreover, a lid element may be provided to permit opening and closing of the ingress/egress opening 6, in which case, an upper end of the lid element may be sewn with the surface cover element 7 adjacent to that opening 6. Preferably, this lid element be releasably secured to the surface cover element 7 for the opening and closing purposes, as by a zipper fastener, a Velcro loop-and-hook fastener, or a magnetic securing device.

DESCRIPTION OF THE REFERENCE NUMERALS

1 . . . vehicle seat
4 . . . box-like container having a robust property sufficient to retain its original shape
4a . . . opening region 6 . . . lateral surface of seat cushion
6 . . . ingress/egress opening 8 . . . slit B . . . tissue paper box
F . . . frame PB . . . foam padding S . . . storage space
SB . . . seat back SC . . . seat cushion

The invention claimed is:

1. A seat cushion for a vehicle, comprising:
a seat cushion divided into one seat cushion portion and another seat cushion portion, said one and another seat cushion portions being positioned along a transverse direction of said vehicle, in such an arrangement as to permit one or both of said one and another seat cushion portions to be displaceable via slide rails in a forward direction of the vehicle to protrude from the other one and another seat cushion portions;
a storage space defined in a forwardly-facing region of a selected one of said one and another seat cushion portions, said selected one of said one and another seat cushion portions being covered by a trim cover section and adapted to be displaced in said forward direction so as to protrude from the other of said one and another seat cushion portions; and
an opening provided to said storage space, said opening constituting an ingress/egress opening of the storage space for allowing an article to be entered thereinto and taken out therefrom, said opening being defined in a lateral surface, extending in a front-rear direction of the vehicle, of said selected one of said one and another seat cushion portions, and said opening being exposed when said selected one of said one and another seat cushion portions is displaced in said forward direction to protrude from the other of said one and another seat cushion portions, and being hidden when said selected one of said one and another seat cushion portions is placed abreast of the other of said one and another seat cushion portions,
wherein said storage space is located inside said trim cover section and located at a position adjacent to said forwardly-facing region of said selected one of said one and another seat cushion portions.

2. The seat for a vehicle as described in claim 1, further comprising:
a box-like container, having a property of retaining its original shape, disposed in said forwardly-facing region of said seat cushion, said box-like container including said storage space defined therein, said box-like container being fixedly secured to a frame provided in said seat cushion.

3. The seat for a vehicle as described in claim 1, further comprising:
a slit formed in said trim cover section so as to communicate with said storage space.

4. The seat for a vehicle as described in claim 1, wherein said storage space is defined by a locally cut-out padding, said padding forming a part of said seat cushion.

5. The seat for a vehicle as described in claim 1, wherein a ratio between said one seat cushion portion to be positioned on a left side of the vehicle and said another seat cushion portion to be positioned on a right side of the vehicle is 6:4 or vice versa as viewed in said transverse direction of the vehicle, and that said storage space is defined either in one of said one and another seat cushion portions or in both of said one and another seat cushion portions.

6. A seat for a vehicle, comprising:
a seat cushion divided into one seat cushion portion and another seat cushion portion, said one and another seat cushion portions being positioned along a transverse direction of said vehicle, in such an arrangement as to permit one or both of said one and another seat cushion portions to be displaceable via slide rails in a forward direction of the vehicle to protrude from the other of said one and another seat cushion portions;
a storage space defined in a forwardly-facing region of a selected one of said one and another seat cushion portions, said selected one of said one and another seat cushion portions being adapted to be displaced in said forward direction so as to protrude from the other of said one and another seat cushion portions;
an opening provided to said storage space, said opening constituting an ingress/egress opening of the storage space for allowing an article to be entered thereinto and taken out therefrom, said opening being defined in a lateral surface, extending in a front-rear direction of the vehicle, of said selected one of said one and another seat cushion portions, and said opening being exposed when said selected one of said one and another seat cushion portions is displaced in said forward direction to protrude from the other of said one and another seat cushion portions, and being hidden when said selected one of said one and another seat cushion portions is placed abreast of the other of said one and another seat cushion portions;
a box-like container, having a property of retaining its original shape, disposed in said forwardly-facing region of said seat cushion, said box-like container including said storage space defined therein, and that said box-like container being fixedly secured to a frame provided in said seat cushion; and a slit formed at a front surface of said forwardly-facing region of said seat cushion so as to communicate with said storage space.

7. A seat for a vehicle, comprising:

a seat cushion divided into one seat cushion portion and another seat cushion portion, said one and another seat cushion portions being positioned along a transverse direction of said vehicle, in such an arrangement as to permit one or both of said one and another seat cushion portions to be displaceable via slide rails in a forward direction of the vehicle to protrude from the other of said one and another seat cushion portions;

a storage space defined in a forwardly-facing region of a selected one of said one and another seat cushion portions, said selected one of said one and another seat cushion portions being covered by a trim cover section and adapted to be displaced in said forward direction so as to protrude from the other of said one and another seat cushion portions;

an opening provided to said storage space, said opening constituting an ingress/egress opening of the storage space for allowing an article to be entered thereinto and taken out therefrom, said opening being defined in a lateral surface, extending in a front-rear direction of the vehicle, of said selected one of said one and another seat cushion portions, said opening being exposed when said selected one of said one and another seat cushion portions is displaced in said forward direction to protrude from the other of said one and another seat cushion portions, and being hidden when said selected one of said one and another seat cushion portions is placed abreast of the other of said one and another seat cushion portions; and a box-like container, having a property of retaining its original shape, disposed in said forwardly-facing region of said seat cushion, said box-like container including said storage space defined therein, and said box-like container being fixedly secured to a frame provided in said seat cushion, wherein a ratio between said one seat cushion portion to be positioned on a left side of the vehicle and said another seat cushion portion to be positioned on a right side of the vehicle is 6:4 or vice versa as viewed in said transverse direction of the vehicle, and that said storage space is defined either in one of said one and another seat cushion portions or in both of said one and another seat cushion portions, wherein said storage space is located inside said trim cover section and located at a position adjacent to said forwardly-facing region of said selected one of said one and another seat cushion portions.

8. A seat for a vehicle, comprising:

a seat cushion divided into one seat cushion portion and another seat cushion portion, said one and another seat cushion portions being positioned along a transverse direction of said vehicle, in such an arrangement as to permit one or both of said one and another seat cushion portions to be displaceable via slide rails in a forward direction of the vehicle to protrude from the other of said one and another seat cushion portions;

a storage space defined in a forwardly-facing region of a selected one of said one and another seat cushion portions, said selected one of said one and another seat cushion portions being adapted to be displaced in said forward direction so as to protrude from the other of said one and another seat cushion portions;

an opening provided to said storage space, said opening constituting an ingress/egress opening of the storage space for allowing an article to be entered thereinto and taken out therefrom, wherein said opening being defined in a lateral surface, extending in a front-rear direction of the vehicle, of said selected one of said one and another seat cushion portions, said opening being exposed when said selected one of said one and another seat cushion portions is displaced in said forward direction to protrude from the other of said one and another seat cushion portions, and being hidden when said selected one of said one and another seat cushion portions is placed abreast of the other of said one and another seat cushion portions;

a box-like container, having a property of retaining its original shape, being disposed in said forwardly-facing region of said seat cushion, said box-like container including said storage space defined therein, and that said box-like container is fixedly secured to a frame provided in said seat cushion; and a slit formed at a front surface of said forwardly-facing region of said seat cushion so as to communicate with said storage space, wherein a ratio between said one seat cushion portion to be positioned on a left side of the vehicle and said another seat cushion portion to be positioned on a right side of the vehicle is 6:4 or vice versa as viewed in said transverse direction of the vehicle, and that said storage space is defined either in one of said one and another seat cushion portions or in both of said one and another seat cushion portions.

9. A seat for a vehicle, comprising:

a seat cushion divided into one seat cushion portion and another seat cushion portion, said one and another seat cushion portions being positioned along a transverse direction of said vehicle, in such an arrangement as to permit one or both of said one and another seat cushion portions to be displaceable via slide rails in a forward direction of the vehicle to protrude from the other of said one and another seat cushion portions;

a storage space defined in a forwardly-facing region of a selected one of said one and another seat cushion portions, said selected one of said one and another seat cushion portions being adapted to be displaced in said forward direction so as to protrude from the other of said one and another seat cushion portions;

an opening provided to said storage space, said opening constituting an ingress/egress opening of the storage space for allowing an article to be entered thereinto and taken out therefrom, said opening being defined in a lateral surface, extending in a front-rear direction of the vehicle, of said selected one of said one and another seat cushion portions, said opening being exposed outwardly on a side facing a center of said vehicle when said selected one of said one and another seat cushion portions is displaced in said forward direction to protrude from the other of said one and another seat cushion portions, and being hidden when said selected one of said one and another seat cushion portions is placed abreast of the other of said one and another seat cushion portions;

a box-like container, having a property of retaining its original shape, being disposed in said forwardly-facing region of said seat cushion, said box-like container including said storage space defined therein, and that said box-like container being fixedly secured to a frame provided in said seat cushion; and a slit formed at a front surface of said forwardly-facing region of said seat cushion so as to communicate with said storage space, wherein said storage space is formed by cutting out a padding locally, said padding forming a part of said seat cushion, and wherein a ratio between said one seat cushion portion to be positioned on a left side of the vehicle and said another seat cushion portion to be positioned on a right side of the vehicle is 6:4 or vice versa as viewed in said transverse direction of the vehicle, and that said storage space is defined either in one of said one and another seat cushion portions or in both of said one and another seat cushion portions.

* * * * *